United States Patent [19]

Goodman

[11] 3,895,025

[45] July 15, 1975

[54] 2-BENZIMIDAZOLETHIOL PREPARATION

[75] Inventor: Alan Lawrence Goodman, Wilmington, Del.

[73] Assignee: E. I. du Pont de Nemours & Co., Wilmington, Del.

[22] Filed: July 23, 1974

[21] Appl. No.: 491,046

Related U.S. Application Data

[63] Continuation-in-part of Ser. No. 346,161, March 29, 1973, abandoned.

[52] U.S. Cl. ............................................ 260/309.2
[51] Int. Cl. ........................................... C07d 49/38
[58] Field of Search ................................. 260/309.2

[56] References Cited
UNITED STATES PATENTS

| | | | |
|---|---|---|---|
| 1,933,962 | 11/1933 | Bogemann et al. | 260/309.2 |
| 2,642,396 | 6/1953 | Roddy | 260/309.2 |
| 2,701,249 | 2/1955 | Koniuszy et al. | 260/309.2 |
| 3,235,559 | 2/1966 | Blocher et al. | 260/309.2 |
| 3,405,136 | 10/1968 | Wright | 260/309.2 |
| 3,558,775 | 1/1971 | Fournier | 260/309.2 |
| 3,842,098 | 10/1974 | Scherhag et al. | 260/309.2 |

FOREIGN PATENTS OR APPLICATIONS

| | | | |
|---|---|---|---|
| 1,346,552 | 11/1963 | France | 260/309.2 |

OTHER PUBLICATIONS

Rabjohn et al., Organic Synthesis, Collective Volume IV, pp. 569-570, N.Y., Wiley, 1963, QD262.072.
Sachs, Liebig's Ann. Chemie., Vol. 365, pp. 141-142 relied on (1909), OD1.L7.

*Primary Examiner*—Natalie Trousoe

[57] ABSTRACT

One can prepare 2-benzimidazolethiols by reacting a specified phenylenediamine with carbon disulfide, in a suitable organic solvent for the diamine, in the presence of a specified quaternary ammonium hydroxide. This process has beneficial utility because of the improvement in the yield and/or in the rate of reaction which can be obtained.

15 Claims, No Drawings

2-BENZIMIDAZOLETHIOL PREPARATION

CROSS-REFERENCE TO RELATED APPLICATIONS

This is a continuation-in-part of U.S. Patent Application Ser. No. 346,161 filed on Mar. 29, 1973, now abandoned.

BACKGROUND OF THE INVENTION

This invention relates to the preparation of 2-benzimidazolethiol compounds.

It is known that 2-benzimidazolethiols and certain derivatives thereof are useful as antioxidants of elastomers. And it is known that these compounds can be made by reacting a suitable phenylenediamine with carbon disulfide in a solvent. However, the industries which manufacture and use these 2-benzimidazolethiol compounds have been seeking an improved process for preparing them. What has been especially desired is a process which enables one to achieve an increase in yield, or an increase in the rate of reaction, or both.

SUMMARY OF THE INVENTION

The present invention provides a process for preparing a 2-benzimidazolethiol which comprises reacting a diamine having the formula

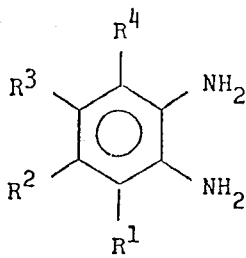

wherein $R^1$, $R^2$, $R^3$ and $R^4$ are independently selected from the group: hydrogen, nitro, halogen and $C_1$–$C_{12}$ alkyl or alkoxy with carbon disulfide in an organic solvent which dissolves said diamine, which has a boiling point of at least 65°C., and which is substantially inert to carbon disulfide, in the presence of about 0.25 – 5.0%, based on the weight of said diamine, of a quaternary ammonium hydroxide having the formula $R^{11}R^{12}R^{13}R^{14}N(OH)$ wherein a. $R^{11}$, $R^{12}$, $R^{13}$ and $R^{14}$ are independently selected from the group: $C_1$–$C_{20}$ alkyl, $C_8$–$C_{20}$ alkenyl, and $C_7$–$C_{30}$ aralkyl and alkyl - substituted aralkyl, b. $R^{11}$ and $R^{12}$ are selected as in (a) above, and $R^{13}$ and $R^{14}$ are selected from $(CH_2CH_2O)_nH$ wherein n is 1–15, or c. $R^{11}$ and $R^{12}$ are selected as in (a), and $R^{13}$ and $R^{14}$ together with the nitrogen form a saturated 6-member ring which optionally contains an ether oxygen in the 4-position.

DESCRIPTION OF PREFERRED EMBODIMENTS

In carrying out the present process, one causes the diamine as described above to react with carbon disulfide in a suitable reaction zone, for example in a conventional batch-type or continuous-type chemical reaction apparatus (reactor). The diamine can be any phenylenediamine having the formula defined above. Examples of such a diamine are those in which the substituents are as follows:

3- or 4-bromo or chloro;
4-iodo;
3,4-, 3,5- 3,6- or 4,5-dichloro;
3,5-, 3,6- or 4,5-dibromo;
3,5-difluoro or diiodo;
3-ethyl or methyl;
4-ethyl, methyl, n-butyl, sec-butyl, tert-butyl, isopropyl, isobutyl, dodecyl, or tert-amyl,
4-ethoxy or methoxy;
4-chloro-3-methoxy;
3,4-dichloro-5,6-dimethyl;
3,5-dichloro-4,6-dimethyl;
3,6-dimethoxy, diethoxy, or dipropoxy;
4,5-dimethoxy, diisopropoxy, or dibutoxy;
3,4-, 3,5-, 3,6-, or 4,5-dimethyl;
3,5- or 4,5-dinitro;
3,6-dibutoxy;
3,4,5,6-tetrachloro or tetrafluoro;
3,4,6-trichloro;
3,4,5-trimethoxy or trimethyl;
3,4,6-trimethoxy;
4-bromo-3,5-dichloro;
5-bromo-3,4-dimethyl;
3-bromo-5-methoxy;
4-chloro-5-methoxy;
4-chloro-5-nitro;
4,5-diethyl;
5-ethoxy-3-nitro;
4-ethyl-5-propyl;
3-methoxy-5-nitro;
4-ethyl-3,5,6-trimethyl;
5-isopropyl-3,4-dimethoxy;
4-methoxy-6-nitro;
5-methoxy-3-nitro.

All of these embodiments of the diamine are known compounds; for example, they are shown in "Chemical Abstracts." One skilled in the art could prepare other embodiments of the specified diamine by using methods similar to those known to be useful for preparing the compounds shown above. One of the most useful diamines is an ortho-toluenediamine(3- or 4-methylorthophenylenediamine).

The reaction procedure used in the present process can vary depending on whether a continuous or batch process is used, and the specific nature of the process equipment. It has been found convenient to combine all of the reaction ingredients except for the $CS_2$, and then to add the $CS_2$ to the reaction zone at a rate about equal to its rate of consumption in the reaction.

The reaction zone contains an organic solvent which dissolves the diamine component, which has a boiling point of at least 65°C., and which is substantially inert to the carbon disulfide (undergoes no harmful reaction with the carbon disulfide under the process conditions being used). One very useful solvent is isopropyl alcohol. The use of several different types of solvent is illustrated below in the examples. One skilled in the art will have no difficulty in selecting other useful solvents having the properties specified from such known solvents as aliphatic monohydric alcohols containing two to six carbon atoms; aliphatic dihydric alcohols containing two to four carbon atoms and monoethers thereof in which the terminal alkyl radical contains one to four carbon atoms; saturated aliphatic hydrocarbons containing six to eight carbon atoms; esters of lower carboxylic acids containing one to four carbon atoms with alcohols containing one to four carbon atoms; aprotic amide solvents, such as dialkyl carboxamides in which the alkyl radicals and the carboxamide portion each contains one to four carbon atoms, and 1-alkyl-2-pyrrolidone in which the alkyl radical contains one to four carbon atoms; and the like; and mixtures of two or more such solvents.

It is an important feature of the present invention that the reaction is carried out in the presence of about 0.25–5.0% (based on the weight of the diamine) of a quaternary ammonium hydroxide compound of the formula set forth above. One can refer to this compound as the "catalyst" component, since it tends to increase the rate at which the diamine reacts with the carbon disulfide. It is often preferred to use about 0.5–3% of this catalyst, based on the weight of the diamine fed to the reactor.

The catalyst can be any quaternary ammonium hydroxide having the formula defined above in the summary of the invention. In certain preferred embodiments of the compounds of this formula:

at least one of the R's (e.g., $R^{11}$) is $C_1$–$C_4$ alkyl;

$R^{12}$ is selected from the group: oleyl, linoleyl, benzyl, $C_4$–$C_{18}$ alkyl and ($C_1$–$C_{12}$ alkyl or dialkyl)benzyl; and $R^{13}$ and $R^{14}$ are selected from $(CH_2CH_2O)_nH$ wherein $n$ is 1–15; or $R^{13}$ and $R^{14}$ together form a piperidine or morpholine ring; or $R^{13}$ is $C_1$–$C_4$ alkyl and $R^{14}$ is $C_1$–$C_{18}$ alkyl.

An especially preferred catalyst is benzyl trimethyl ammonium hydroxide. Another is (methyldodecylbenzyl)trimethyl ammonium hydroxide. Other examples of specific catalysts include the following:

tetrabutylammonium hydroxide,
benzyldodecyldimethylammonium hydroxide,
benzyldimethyloctadecylammonium hydroxide,
1-ethyl-1-hexadecylmorpholinium hydroxide,
1-benzyl-1-methylpiperidinium hydroxide,
hexadecyltrimethylammonium hydroxide,
dodecylmethylbis(2-hydroxyethyl)ammonium hydroxide,
didodecyldimethylammonium hydroxide,
ditetradecyldimethylammonium hydroxide, and
dihexadecyldimethylammonium hydroxide.

In addition to the quaternary ammonium hydroxide specified as required, there can also be present in the reaction mixture a minor amount (e.g., about 1–40%, based on the total quaternary ammonium hydroxide present) of a quaternary ammonium hydroxide not within the formula defined above, and not harmful to the reaction. An example of such a compound is (methyldodecylxylylenebis) trimethyl ammonium hydroxide.

In some embodiments of the present process, the required quaternary ammonium hydroxide is formed in situ (in the reactor) by reacting a quaternary ammonium salt with sodium hydroxide or potassium hydroxide. Various quaternary ammonium salts which are useful for this purpose are commercially available as surface active agents, often as the chloride, ethosulfate, or other salt. Such compounds are often derived from vegetable or animal oils, and contain oil-derived radicals having varying chain lengths, usually ranging from 8 to 18 carbon atoms; these can contain one double bond (from oleic acid) or two double bonds (from linoleic acid).

The temperature in the reaction zone is usually maintained at about 65°–150°C., preferably about 75°–100°C. After all the reaction zone contents have been added, including the carbon disulfide, the reaction temperature is maintained until evolution of hydrogen sulfide has ceased. A total reaction time of about 2–10 hours is usually sufficient to complete the reaction.

After completion of the reaction, the benzimidazolethiol product can be isolated by conventional techniques. For example, it can simply be filtered from the reaction zone mixture, washed, and dried. If the solvent is water-soluble, the reaction zone mixture can be poured into water to assist in precipitation of the product.

An important beneficial result which can be obtained by the present process is an increase in the rate of reaction, as evidenced by a shorter time required for addition of the carbon disulfide and a shorter time to complete the evolution of hydrogen sulfide. Another valuable advantage is that a greater yield of product can often be obtained compared with the yield obtained when the specified quaternary ammonium hydroxide compound is omitted.

The following examples illustrate the invention; all amounts are by weight unless otherwise indicated.

EXAMPLE 1

A 500-ml. round-bottomed flask was equipped as a reaction vessel with stirrer, thermometer, heating mantle, condenser with a thermometer measuring vapor temperature, and addition tube positioned below the normal surface of the liquid. The condenser outlet was connected to a caustic scrubber.

Into the flask were placed 66 grams of orthotoluenediamine in 200 ml. of isopropyl alcohol. The orthotoluenediamine used contained 92.6% of 2,3- and 3,4-toluenediamine and 4.4% of 2,6- and 2,4-isomers. Accordingly, 66 grams of the starting material contained 0.5 mole of orthotoluenediamine. The reaction was carried out in the presence of about 1%, by weight of the o-toluenediamine, of a quaternary ammonium hydroxide. The quaternary ammonium portion of the compound is a mixture containing 80 percent (methyldodecylbenzyl)trimethylammonium ion and 20% of (methyldodecylxylylenebis)trimethylammonium ion. The material was added to the reaction mixture as 1.5 ml. of the chloride ("Hyamine" 2389, Rohm and Haas, a 50% aqueous solution);and 0.11 gram of sodium hydroxide added to provide the hydroxide ion of the quaternary catalyst compound.

The temperature of the vapor and liquid were monitored. 40 milliliters (50.4 g., 0.66 mole) of carbon disulfide were added at such a rate as to keep the vapor temperature no less than 5°C. below the pot temperature. The temperature ranged from 75° to 85°C. during the $CS_2$ addition, the time required for the addition of $CS_2$ being dependent on the rate of reaction with the toluenediamine. After the carbon disulfide had been added, refluxing was continued until evolution of $H_2S$ had ceased.

The product was isolated by pouring the reaction mass into water, filtering, washing the solid with water, and finally drying at 90°C. in a vacuum oven under nitrogen. The yield is based on the o-toluenediamine in the starting material. The results are summarized in Table I. The above procedure was repeated for purposes of comparison, but no quaternary compound was added. The tabulated results are designated "Comparison A." The reaction was again repeated, except that no quaternary ammonium compound or sodium hydroxide was added. The tabulated results are designated "Comparison B." As shown in the table, a much better yield and some reduction in reaction time were obtained in the Example 1 process.

TABLE I

|  | Reaction Time, Minutes | | Yield,% |
|---|---|---|---|
|  | CS$_2$ Addn. | Total |  |
| Example 1 | 120 | 280 | 99.4 |
| Comparison A | 195 | 285 | 92.3 |
| Comparison B | 315 | 435 | 50.2 |

EXAMPLES 2-3

The general procedure of Example 1 was repeated, except that the quaternary ammonium hydroxide used was benzyltrimethylammonium hydroxide; varying amounts were used, as shown in Table II. The amount of this catalyst used in Comparison C is below the minimum specified in the present process. The amount of catalyst shown in the table is percent, based on the weight of toluenediamine used. It can be seen that a marked improvement in yield and a significant reduction in reaction time were obtained in Examples 2 and 3.

TABLE II

|  | Amt. of Catalyst | Reaction Time, Minutes | | Yield,% |
|---|---|---|---|---|
|  |  | CS$_2$ Addn. | Total |  |
| Comparison C | 0.12 | 275 | 405 | 76.2 |
| Example 2 | 0.5 | 80 | 165 | 97.6 |
| Example 3 | 1.0 | 80 | 125 | 96.2 |

EXAMPLE 4

The general procedure of Example 1 was repeated, except that the solvent was ethylene glycol, the reaction temperature was 100°C., and 1% of benzyltrimethylammonium hydroxide was used as the quaternary catalyst compound. Comparison D was made by using none of the catalyst compound. The results are summarized in Table III, which shows that a significant reduction in reaction time was obtained in Example 4.

TABLE III

|  | Reaction Time, Minutes | | Yield, % |
|---|---|---|---|
|  | CS$_2$ Addn. | Total |  |
| Example 4 | 75 | 150 | 99 |
| Comparison D | 110 | 260 | 98.4 |

EXAMPLES 5-7

The reactions of Examples 5-7 were carried out substantially as described in Example 1, except that different solvents were used; and the catalyst was benzyltrimethylammonium hydroxide in an amount of about 1%, based on the o-toluenediamine. Results are shown in Table IV. In Example 7, since the solvent was not water-soluble, the product was isolated by filtration and drying; the reaction zone mixture was not poured into water as in Example 1.

TABLE IV

| Example | Solvent | Reaction Temp. °C. | Reaction Time, Minutes | | Yield, % |
|---|---|---|---|---|---|
|  |  |  | CS$_2$ Addition | Total |  |
| 5 | Ethyl Acetate | 65-70 | 135 | 270 | 95.6 |
| 6 | Dimethyl formamide | 100 | 100 | 340 | 98.8 |
| 7 | Heptane | 86 | 100 | 270 | 99.3 |

EXAMPLE 8

The general procedure of Example 1 was repeated, except that 500 ml. of isopropyl alcohol solvent was used; and the quaternary ammonium hydroxide used was 1.5% of alkylbenzyldimethylammonium hydroxide, wherein the group designated as "alkyl" is a mixture of $C_{12}$ to $C_{16}$ alkyl radicals derived from coconut oil. This hydroxide was obtained by adding the chloride of this compound, commercially available from Rohm and Haas Company as "Hyamine" 3500, together with 0.11 gram of NaOH. In Comparison E, the sodium hydroxide was omitted, leaving the catalytic compound in its chloride form.

The results are summarized in Table V. In Example 8, because of the use of the catalyst compound specified for the present invention, a marked improvement in yield and a great reduction in reaction time were obtained.

TABLE V

|  | Reaction Time, Min. | | Yield,% |
|---|---|---|---|
|  | CS$_2$ Addition | Total |  |
| Example 8 | 90 | 210 | 92.7 |
| Comparison E | 380 | 500 | 87.4 |

EXAMPLES 9-14

The general procedure of Example 1 was repeated, except that the following catalysts were used. In every case, the amount of catalyst was 1% based on weight of diamine.

EXAMPLE 9 tetrabutylammonium hydroxide

EXAMPLE 10:

hexadecyltrimethylammonium hydroxide

EXAMPLE 11

R-N⁺(CH₃)(CH₂CH₂OH)₂ OH⁻ wherein the R is a mixture of C₁₂–C₁₆ alkyl radicals derived from coconut oil. (Derived from "Ethoquad" C/12, Armour Industrial Chemical Co., by adding 0.11 gram of NaOH to the reaction mixture.)

EXAMPLE 12

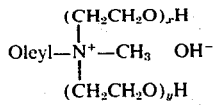

wherein x and y are at least one and x + y = 15. (Derived from "Ethoquad" 0/25, Armour Industrial Chemical Co., by adding 0.11 gram of NaOH to the reaction mixture.)

EXAMPLE 13

N-cetylethylmorpholinium hydroxide (Derived from "Atlas" G-263, ICI America, Inc., which is the ethosulfate, by adding 0.11 gram NaOH to the reaction mixture.)

EXAMPLE 14

Dialkyldimethylammonium hydroxide wherein the alkyl radicals are C₁₂–C₁₆ alkyl radicals derived from coconut oil (derived from "Variquat" K-300, Varney Chemical Corp., by adding 0.11 gram NaOH to the reaction mixture.)

Comparison F

Only 0.11 gram of NaOH was added to the reaction mixture and no quaternary ammonium compound.

The results are shown in Table VI, which again shows that an increase in yield and rate of reaction were obtained by using the novel process of this invention.

TABLE VI

| Example | Reaction Time, Min. | | Yield,% |
|---|---|---|---|
| | CS₂ Addition | Total | |
| 9 | 120 | 210 | 100 |
| 10 | 110 | 190 | 97.5 |
| 11 | 95 | 220 | 99.2 |
| 12 | 110 | 190 | 96 |
| 13 | 135 | 255 | 97.5 |
| 14 | 90 | 250 | 99 |
| Comparison F | 180 | 300 | 95.1 |

I claim:

1. A process for preparing a 2-benzimidazolethiol which comprises reacting
a diamine having the formula

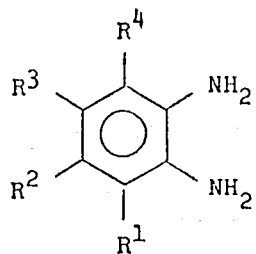

wherein R¹, R², R³ and R⁴ are independently selected from the group: hydrogen, nitro, halogen and C₁–C₁₂ alkyl or alkoxy
with carbon disulfide
in an organic solvent which dissolves said diamine, which has a boiling point of at least 65°C., and which is substantially inert to carbon disulfide,
in the presence of about 0.25 – 5.0%, based on the weight of said diamine, of a quaternary ammonium hydroxide having the formula R¹¹R¹²R¹³R¹⁴N(OH) wherein
  a. R¹¹, R¹², R¹³ and R¹⁴ are independently selected from the group: C₁–C₂₀ alkyl, C₈–C₂₀ alkenyl, and C₇–C₃₀ aralkyl and alkyl - substituted aralkyl,
  b. R¹¹ and R¹² are selected as in (a) above, and R¹³ and R¹⁴ are selected from (CH₂CH₂O)ₙH wherein n is 1–15, or
  c. R¹¹ and R¹² are selected as in (a), and R¹³ and R¹⁴ together with the nitrogen form a saturated 6-member ring which optionally contains an ether oxygen in the 4-position.

2. A process according to claim 1 wherein, in the quaternary ammonium hydroxide formula, R¹¹ is C₁–C₄ alkyl.

3. A process according to claim 2 wherein R¹² is selected from the group: oleyl, linoleyl, benzyl, C₄–C₁₈ alkyl and (C₁–C₁₂ alkyl or dialkyl)benzyl.

4. A process according to claim 3 wherein R¹³ and R¹⁴ are selected from (CH₂CH₂O)ₙH wherein n is 1–15.

5. A process according to claim 3 wherein R¹³ and R¹⁴ together form a piperidine or morpholine ring.

6. A process according to claim 1 wherein the amount of quaternary ammonium hydroxide present is about 0.5–3% based on the weight of said diamine.

7. A process according to claim 1 wherein said organic solvent is isopropyl alcohol.

8. A process according to claim 1 wherein the reaction is carried out at about 65°–50°C.

9. A process according to claim 1 wherein the reaction is carried out at about 75°–100°C.

10. A process according to claim 1 wherein the quaternary ammonium hydroxide is benzyl trimethyl ammonium hydroxide.

11. A process according to claim 1 wherein the quaternary ammonium hydroxide is (methyldodecylbenzyl)trimethyl ammonium hydroxide.

12. A process according to claim 1 wherein the carbon disulfide is added to the reaction zone at a rate about equal to its rate of consumption in the reaction.

13. A process according to claim 1 wherein the quaternary ammonium hydroxide is formed in situ by reacting a quaternary ammonium salt with sodium hydroxide or potassium hydroxide.

14. A process according to claim 1 wherein said diamine is ortho-toluenediamine.

15. A process according to claim 3 wherein R¹³ is C₁–C₄ alkyl and R¹⁴ is C₁–C₁₈ alkyl.

* * * * *